June 13, 1950 J. B. BLACK ET AL 2,511,039
POWER TRANSMISSION
Filed March 5, 1948 5 Sheets-Sheet 1

Inventors
James B. Black.
Wilbur F. Shurts.
By John M Darley
Attorney.

June 13, 1950
J. B. BLACK ET AL
2,511,039
POWER TRANSMISSION
Filed March 5, 1948
5 Sheets-Sheet 2
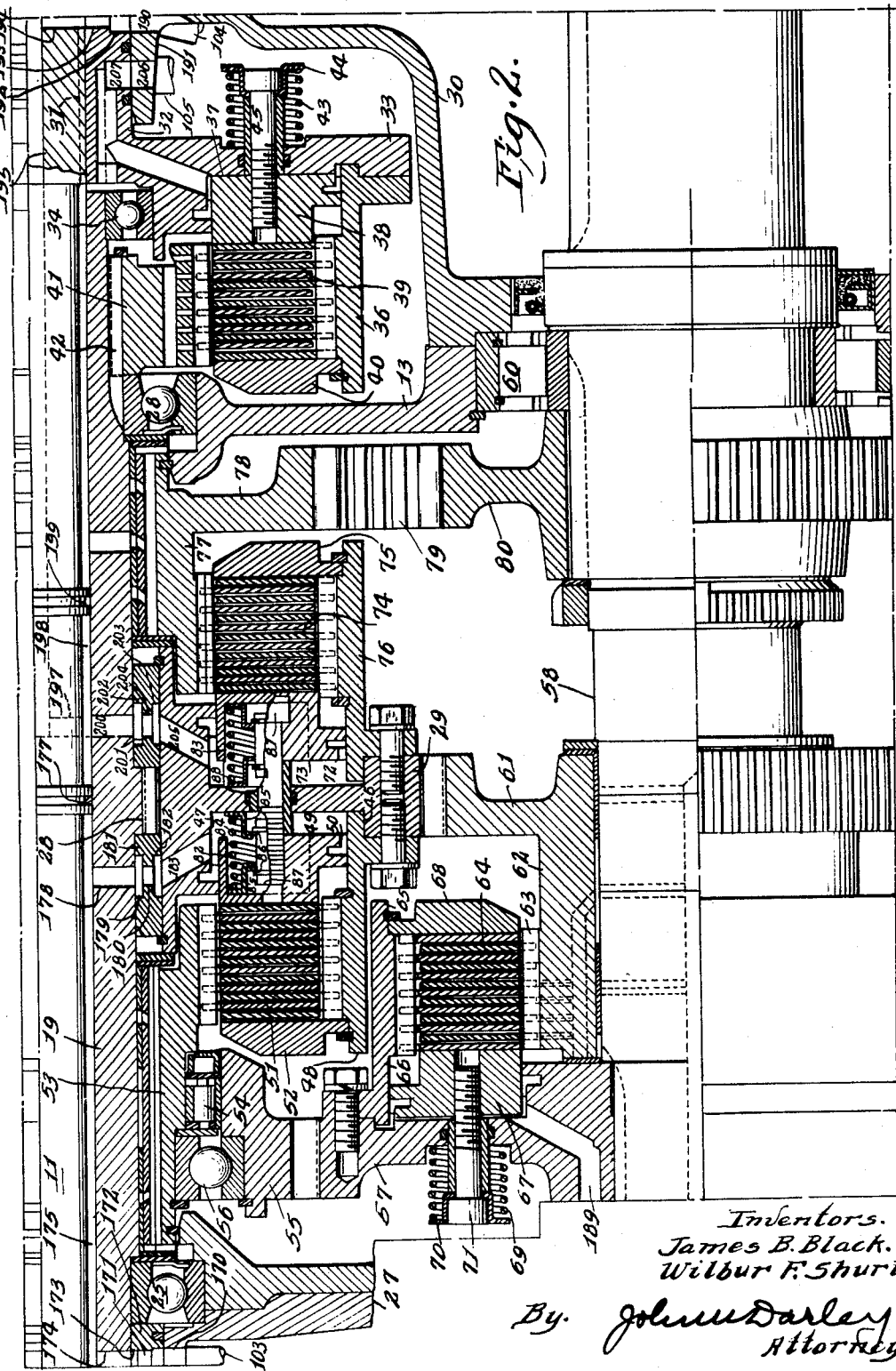
Inventors.
James B. Black.
Wilbur F. Shurts
By. John M Darley
Attorney.

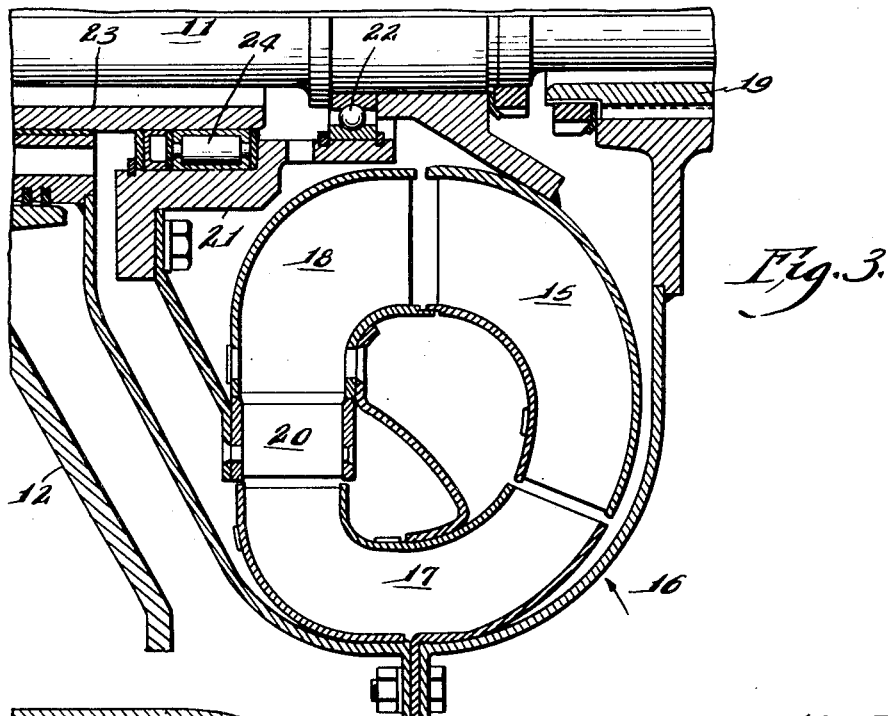
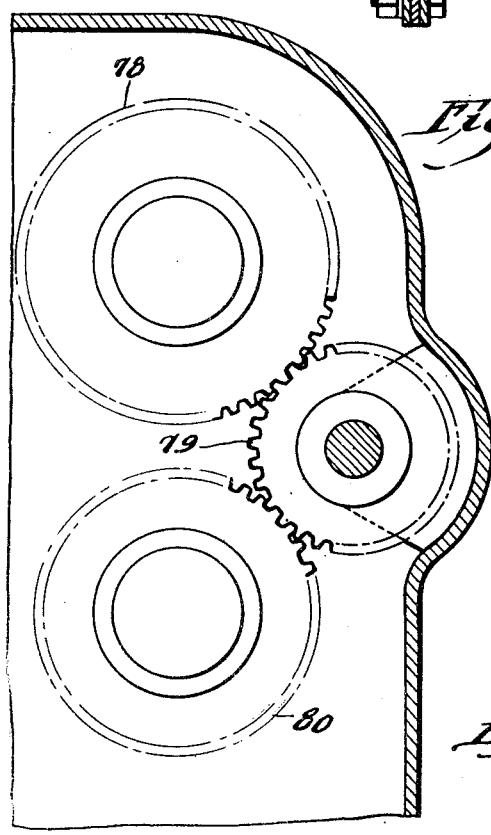
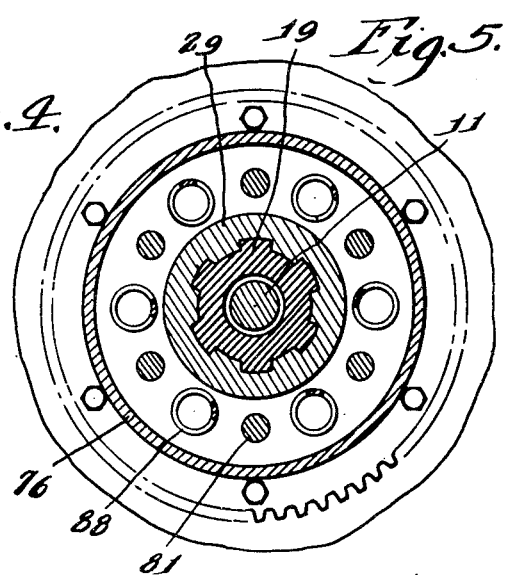

June 13, 1950 J. B. BLACK ET AL 2,511,039
POWER TRANSMISSION
Filed March 5, 1948 5 Sheets-Sheet 4
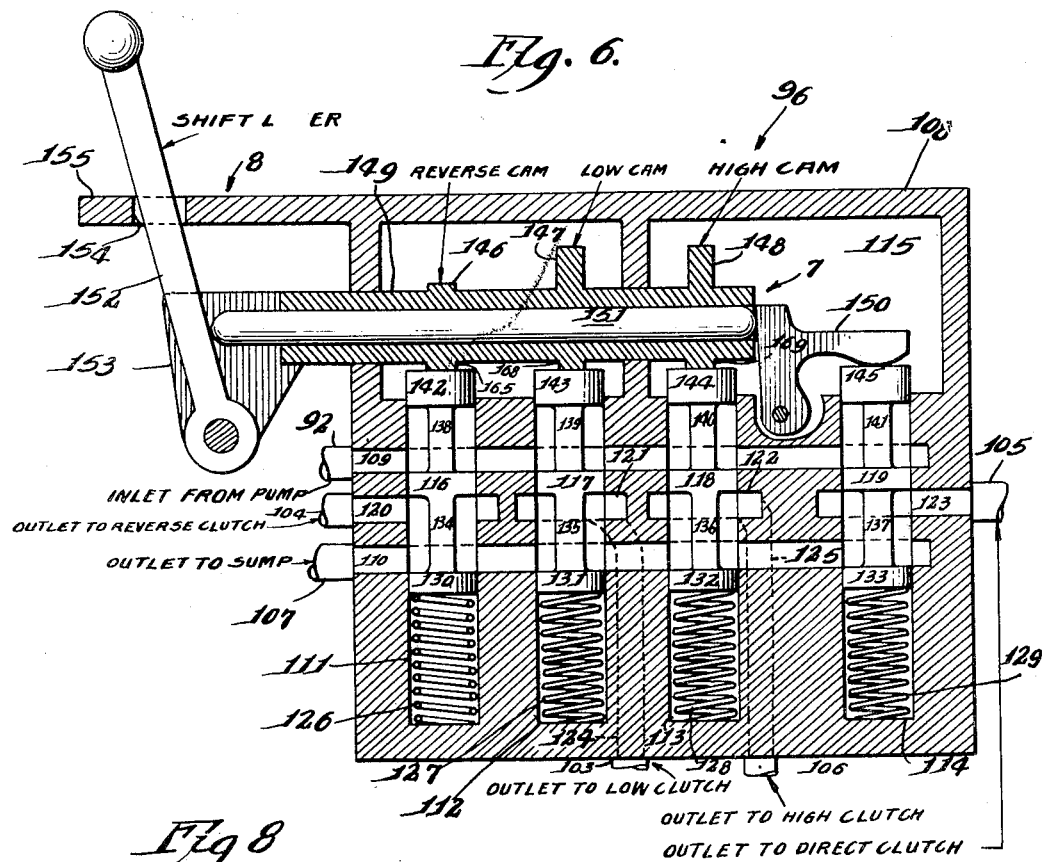
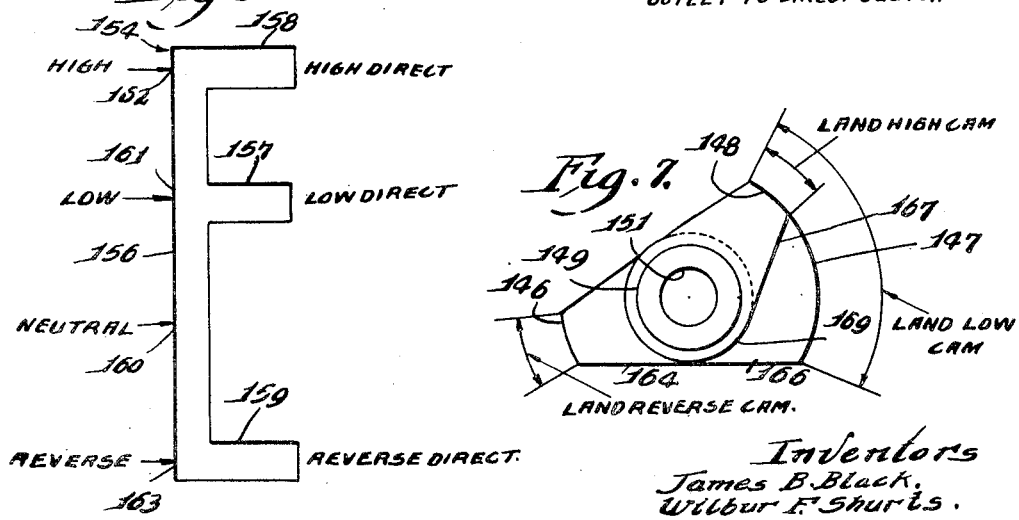
Inventors
James B. Black,
Wilbur F. Shuris.
By John M Darley
Attorney.

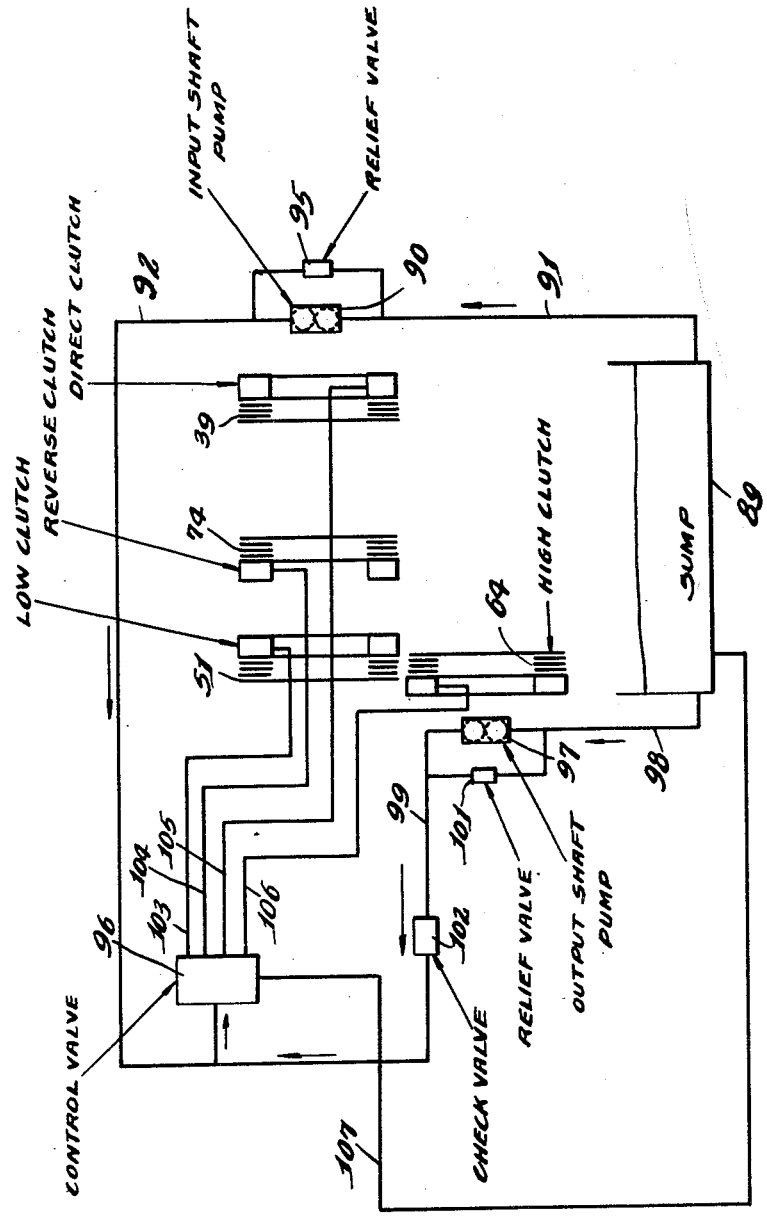

Patented June 13, 1950

2,511,039

UNITED STATES PATENT OFFICE 2,511,039

POWER TRANSMISSION

James B. Black and Wilbur F. Shurts, Rockford, Ill., assignors to Twin Disc Clutch Company, Racine, Wis., a corporation of Wisconsin Application March 5, 1948, Serial No. 13,258

10 Claims. (Cl. 74—720)

Our invention relates to power transmissions and more particularly to an arrangement in which power may be hydraulically or directly transmitted to the load through a selective, change speed gear mechanism, including a reverse gear.

Power transmissions which embody hydraulic and direct drive features with the capacity to shift from one drive to the other are well known and desirable because the high starting torque developed in the hydraulic drive enables heavy loads to be rapidly and smoothly accelerated, while the direct drive provides normal, full speed operation at maximum efficiency. However, it is well established that, in characteristic forms of such units, there is a period during the shift from hydraulic to direct drive, or vice versa, when the engine is not connected to the load and hence will accelerate rapidly which is objectionable. For example, in a typical unit wherein a hydraulic torque converter provides the hydraulic drive, the power source is selectively connected to the converter or directly to the driven shaft through friction clutches and in shifting from one drive to the other, the unavoidable time required to disengage one clutch and engage the other leaves an interval when the power source is unconnected to the load.

It is therefore one object of our invention to devise a power transmission arranged for selective hydraulic or direct drive through a change speed gear mechanism in which provision is made for effecting a full power shift between all forward speed gears in either direction under hydraulic or direct drive conditions so that the engine or other power source is at all times coupled to the load.

A further object is to provide a transmission having the above characteristics in which the power flow through any gear, including reverse gear, is not interrupted during the shift from hydraulic to direct drive, or from direct to hydraulic.

A further object is to devise a transmission as indicated in which the change speed mechanism employs constantly meshing spur gears whose power transmission is established by selectively controlled, hydraulically actuated clutches.

These and further objects of our invention will be set forth in the following specification, reference being had to the accompanying drawings, and the novel means by which said objects are effectuated will be definitely pointed out in the claims.

In the drawings:

Fig. 2 is an enlarged, fragmentary, sectional elevation of the change speed mechanism as viewed in Fig. 1.

Fig. 3 is an enlarged, fragmentary section of the hydraulic torque converter which constitutes the fluid power transmitting part of the unit.

Fig. 4 is a section along the line 4—4 in Fig. 1 showing the idler gear for transmitting reverse drive to the output shaft.

Fig. 5 is a section along the line 5—5 in Fig. 1 showing the alternating relation of the bolts connecting the pistons for the low and reverse clutches, and the release springs for these clutches.

Fig. 6 is a sectional elevation of the control valve for regulating flow of actuating liquid to the several clutches, the parts of the valve occupying positions corresponding to the disengaged clutch positions shown in Fig. 2.

Fig. 7 is an end view of the multiple cam sleeve in the control valve looking in the direction of the arrow 7 in Fig. 6.

Fig. 8 is a diagrammatic, plan view of the control valve, shift lever guide as viewed in the direction of the arrow 8 in Fig. 6.

Fig. 9 is a schematic view of the hydraulic system for actuating the several clutches.

Figure 1:
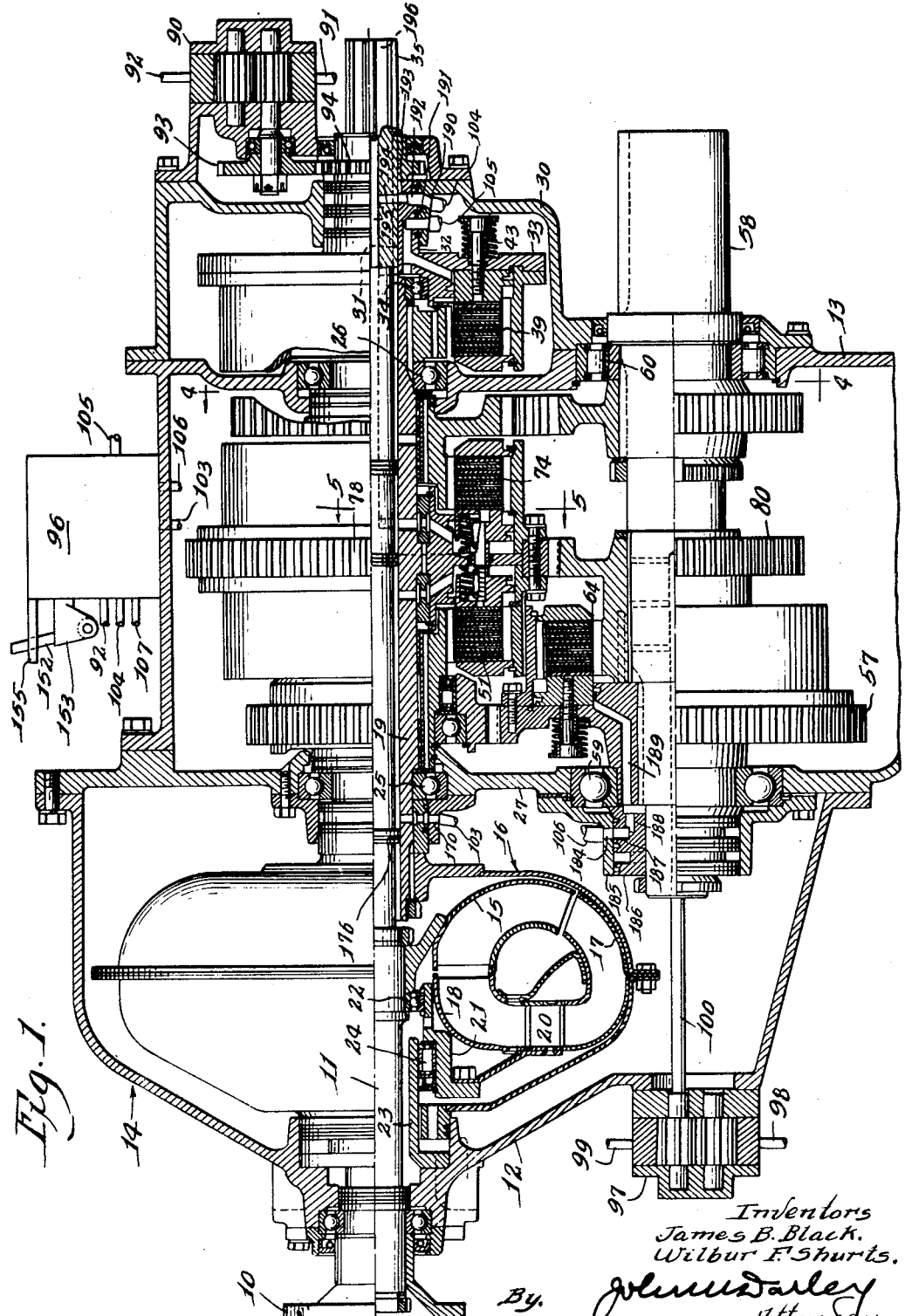
Fig. 1 is a sectional elevation of the transmission with all clutches in disengaged position.

Referring to Figs. 1, 2 and 3, the numeral 10 designates a coupling flange that may be driven by an engine or other power source (not shown) and which is keyed to one end of a driving or input shaft 11 suitably journaled in the end walls 12 and 13 of a transmission housing 14.

A bladed pump 15 forming part of a hydraulic torque converter 16 is keyed to the shaft 11 adjacent the housing wall 12 and its outlet and inlet ends are respectively operably related to connected, bladed turbines 17 and 18 constituting first and second stages of the converter and which are keyed to one end of a driven sleeve 19 that extends towards the housing wall 13, is concentric with the shaft 11 and spaced therefrom for a purpose presently explained. A bladed, reaction member 20 is located between the turbines 17 and 18 and functions in the characteristic manner when power is transmitted through the converter. Between the converter 16 and the housing wall 12, the reaction member 20 is secured to a sleeve 21 that encircles and is journaled on the shaft 11 by a bearing 22, and a concentric sleeve 23 extends within the sleeve 21 and is appropriately secured against rotation to the housing 14. Interposed between the sleeves 21 and 23 is a freewheel or overrunning clutch 24 of characteristic construction which is arranged to hold the reaction member 20 stationary during power transmission through the converter and to permit its rotation with the pump 15 and turbines 17 and 18 during direct drive. The internal construction of the converter 16 insofar as it concerns blade shapes and relative lengths of paths for the working liquid in the pump and turbine stages forms no part of the present invention.

The sleeve 19 is journaled in bearings 25 and 26 carried respectively by an intermediate wall 27 within the housing 14 and by the end wall 13, and between these bearings is externally splined at 28 (see Figs. 2 and 5) for constant engagement with an internally splined, spur, carrier pinion 29, thus completing drive through the converter 16 to this point of the transmission.

For accomplishing direct drive from the engine to the same point, the driven shaft 11 extends through a cover 30 (see Figs. 1 and 2) bolted to the housing wall 13 and is splined at 31 from the right end thereof for a convenient distance inwardly of the cover for driving engagement with a sleeve hub 32 forming part of a disk 33 which may be journaled on a bearing 34 carried by the right end of the driven sleeve 19. As shown in Fig. 1, the right extremity of the shaft 11 may be exposed as at 35 for use as a power take-off driving auxiliary appliances.

Referring more particularly to Fig. 2, the left face of the disk 33 is annularly recessed to provide a shoulder on which is fitted a driving ring 36, a portion of whose inner surface forms with adjacent surfaces of the disk 33 an annular cylinder 37. An annular piston 38 is operable in the cylinder 37 and when moved towards the left frictionally engages a plurality of annular plates constituting a direct drive clutch 39, hereinafter referred to as the direct clutch, against an abutment ring 40. Alternate plates of the direct clutch 39 have driven and sliding engagement with the ring 36 and the intervening plates have sliding and driving engagement with an annulus 41 that is interally splined at 42 to connect with the right end of the driven sleeve 19. The direct clutch 39 is engaged by hydraulic means and transmission of power therethrough, or through the converter 16, is a matter of selection, all as presently described. The piston 38 is moved to release position by a plurality of springs 43 spaced around the disk 33, only one spring being illustrated. One end of each spring 43 abuts the right side of the disk 33 and the opposite end bears against the washer 44 which engages the head of a cap screw 45 that extends slidably through the disk, is threaded in the piston 38, and provides driving connection between the disk 33 and piston 38.

From the foregoing, it will be apparent that power flow through the converter 16 or the direct clutch 39 is applied to the pinion 29 and the means whereby this flow is conditioned to produce definite forward and reverse, output speeds will now be described.

The left face of the pinion 29, as viewed in Fig. 2, is annularly counterbored to form an annular shoulder 46 and inwardly thereof an annular surface 47. Fitting on the shoulder 46 and extending normally away from the plane of the pinion 29 is a driving ring 48 and a part of the inner surface of this ring forms with the surface 47 and the radially included surface of the pinion an annular cylinder 49. An annular pistin 50 is slidable in the cylinder 49 and when moved towards the left frictionally engages a plurality of annular plates constituting a low speed clutch 51, hereinafter referred to as the low clutch, against an abutment ring 52 rigidly secured to the driving ring 48. Alternate plates of the low clutch 51 have driven and sliding engagement with the ring 48 while the intervening plates have driving and sliding engagement with a sleeve 53 that is journaled on the main driven sleeve 19. The low clutch 51 is hydraulically engaged by means presently described and is moved to release position by parts associated with the reverse clutch and will be described in connection therewith.

A freewheel or overrunning clutch 54 is interposed between the sleeve 53 and a surrounding pinion 55 which is journaled by a bearing 56 on the sleeve 53. The overrunning clutch 54 transmits power to the pinion 55 when power flows through the low clutch 51, but runs free when the drive is through the high speed clutch, presently described, notwithstanding that the low clutch is engaged. The pinion 55 is in constant mesh with a gear 57 keyed to an output shaft 58 that is journaled in bearings 59 and 60 in the housing walls 27 and 13, respectively, and extends beyond the latter wall for connection to the load. Hence, when the low clutch 51 is engaged and the other speed clutches presently described are disengaged, the power source may drive through the converter 16 or the direct clutch 39.

For the purpose of securing high speed drive, the pinion 29 is in constant mesh with a gear 61 freely journaled on the output shaft 58. The hub 62 of the gear 61 is splined at 63 for driving and relative sliding engagement with a plurality of annular plates constituting parts of a high speed clutch 64, hereinafter referred to as the high clutch, whose remaining plates are drivingly and slidably connected to a ring 65 bolted to the web of the gear 57. A portion of the inner surface of the ring 65 and a turned portion of the web of the gear 57 forms an annular cylinder 66 in which is slidable an annular piston 67. When moved towards the right, as viewed in Fig. 2 and as hereinafter described, the piston engages the plates of the high clutch 64 against an abutment ring 68 rigidly secured to the ring 66. In shifting from low speed to high speed, the characteristic method of operating this transmission leaves the low clutch 51 engaged when the high clutch 64 is engaged to provide a full power shift and the high clutch then takes the drive away from the low clutch by reason of the action of the overrunning clutch 54. The clutch 64 is hydraulically engaged by means presently described and the piston 67 is shifted to release position by a plurality of springs 69 spaced around the gear 57, only one being shown. One end of each spring 69 abuts the side of the web of the gear 57 which is opposite to the cylinder 66 and the other end of the spring bears against a washer 70 carried by a cap screw 71 which slidably extends through the gear 57 and is threaded in the piston 67. The screws 71 additionally act as a driving connection between the gear 57 and the piston 67.

For reversing drive through the transmission, an annular cylinder 72 is provided on the pinion 29 in opposed and coaxial relation to the cylinder 49, and slidable in the former cylinder is a piston 73 which, when moved towards the right as viewed in Fig. 2 by hydraulic means presently described, engages a plurality of annular clutch plates constituting a reverse clutch 74. This engagement is effected against an abutment ring 75 rigidly secured to a driving ring 76 bolted to the web of the pinion 29, a portion of the inner surface of the ring 76 forming part of the cylinder 72. Alternate plates of the reverse clutch 74 have driven and sliding engagement with the ring 76 and the intervening plates have like engagement with the hub 77 of a gear 78 that is journaled on the driven sleeve 19 between the housing wall 13 and the pinion 29. The gear 78 is in constant mesh with an idler gear 79 (see Fig. 4) that is suitably carried by the housing and the gear 79 is in constant mesh with a gear 80 keyed to the output shaft 58.

Release of the piston 73 is effected by a spring assembly interposed between the low clutch piston 50 and the pinion 29 and release of the latter piston is accomplished by a spring assembly interposed between the piston 73 and the same pinion. As indicated in Fig. 2, the pistons 50 and 73 are tied together for simultaneous movement by screws 81 which are slidable through the web of the pinion 29 and drivably connect the pistons thereto. Any desired number of these screws are spaced around the pinion 29, a characteristic arrangement being shown in Fig. 5 and intervening between the screws are pockets 82 and 83 in the pistons 50 and 73, respectively. In each pocket 82 is mounted a spring assembly comprising a helical spring 84 whose ends respectively abut outer flanges provided on cup-shaped washers 85 and these flanges constantly bear respectively against the end wall of the pocket and the adjacent side of the pinion 29. Extension of the spring 84 is limited by engaging inner flanges on the washers with spaced, retaining rings 86 mounted on a carrier 87. Springs 88 identical with the springs 84 are positioned in the pockets 83 and each spring 88 forms part of an assembly like that described for the springs 84. It will be apparent therefore that the springs 84 act to release the reverse clutch piston 73 and that the springs 88 act to release the low clutch piston 50.

Due to the limits imposed on their extension, the springs 84 and 88 are slightly compressed when the pistons 50 and 73 are in fully released position and this condition, in conjunction with the tying together of these pistons, insures that the springs can precisely center the pistons in neutral position. Variations in spring pressure are thereby avoided which might otherwise cause one of the pistons to stop short of true neutral position, i. e., when both pistons are released, with consequent dragging of the associated clutch plates.

The hydraulic system for controlling the actuation of the clutches 39, 51, 64 and 74 is schematically illustrated in Fig. 9 to which reference will now be made. The working liquid for the system is provided by the lubricating oil for the transmission and is withdrawn from a sump 89, which is characteristically a convenient lower part of the transmission housing 14, by a gear pump 90 through a pipe 91 and is discharged through a pipe 92. As indicated in Fig. 1, the pump 90 is carried by the cover 30 and is driven by a gear 93 that meshes with a gear 94 keyed to the input shaft 11. A pressure relief valve 95 is bridged around the pump 90 to regulate pressure in the pipe 92. The delivery end of the pipe 92 connects with a control valve 96 which, as shown in Fig. 1, may be carried by the top wall of the transmission housing 14.

Oil is also withdrawn from the sump 89 by a gear pump 97 through a pipe 98 and is discharged through a pipe 99. As also shown in Fig. 1, the pump 97 is carried by the housing 14 and is driven from the output shaft 58 by a reduced extension 100 thereof. A relief valve 101 may be bridged around the pump 97 to regulate pressure in the pipe 99, but this valve may be omitted if desired since the valve 95 will regulate pressure in the system. The delivery end of the pipe 99 connects with the pipe 92 adjacent the valve 96 and the pipe 99 includes a check valve 102 which permits the oil to flow from the pump 97 to the valve 96 but prevents reverse flow which would otherwise occur when the reverse clutch 74 is engaged since the pump 97 is driven from the output shaft 58. Pipes 103, 104, 105 and 106 connect the valve 96 with the low, reverse, direct and high clutches 51, 74, 39 and 64, respectively, and a pipe 107 provides a return connection from the valve 96 to the sump 89.

The structural details of the control valve 96, which determines actuation of the respective hydraulic clutches, are shown in Figs. 6, 7 and 8 and will now be described. This valve includes a body 108 having a pair of spaced, horizontal, supply and return passages 109 and 110, respectively, extending inwardly of the body from the left end thereof, as viewed in Fig. 6, and terminating short of the opposite end of the body. The open end of the passage 109 connects with the delivery end of the main supply pipe 92 and the similar end of the passage 110 is connected to the inlet end of the return passage 107. Intersecting the passages 109 and 110 are vertical cylinders 111, 112, 113 and 114 spaced from left to right across the body 108, the lower ends of the cylinders being closed by the bottom wall of the body and the upper ends opening into a chamber 115 in the upper part of the body.

Piston valves 116, 117, 118 and 119 are slidable in the cylinders 111, 112, 113 and 114 and when in the positions shown in Fig. 6 deny communication between the passage 109 and chambers 120, 121, 122, and 123, all respectively, the latter chambers being unconnected with each other and located in the same horizontal plane across the body 108 between the passages 109 and 110. The chamber 120 communicates with the pipe 104, the chambers 121 and 122 connect with the pipes 103 and 106 through passages 124 and 125, respectively, in the body 108, and the chamber 123 communicates with the pipe 105. The valves 116, 117, 118 and 119 are biased upwardly by springs 126, 127, 128 and 129 seated in the bottoms of the cylinders 111, 112, 113 and 114, the upper ends of the springs bearing against guides 130, 131, 132 and 133 which are connected to the valves by necks 134, 135, 136 and 137, all respectively, each neck having a diameter less than that of the associated cylinder. In the operation of the control valve 96, the valves 116, 117, 118 and 119 never mask any portion of the supply passage 109 and, in the closed positions shown in Fig. 6, are located in their respective cylinders between the passage 109 and the plane which includes the passages 120, 121, 122 and 123; likewise, the guides 130, 131, 132 and 133 never mask any portion of the return passage 110 since they are always positioned below this passage.

Necks 138, 139, 140 and 141, each similar to neck 130, extend upwardly from the valves 116, 117, 118 and 119 for connection with guide followers 142, 143, 144 and 145 which bear against plate cams 146, 147 and 148 provided on a sleeve 149 extending within the chamber 115 and journaled in the body 108, and against one arm of a rocker 150 pivoted in the chamber 115, all respectively. The other arm of the rocker 150 is positioned for actuation by the inner end of a plunger 151 slidable through the sleeve 149 and having its outer end operably related to a shift lever 152 whose lower end is pivoted between a pair of ears 153 that are connected to the sleeve 149.

The upper end of the lever 152 extends through a slotted guide 154 provided in an extension 155 of the top wall of the body 108. The guide 154 is E-shaped in plan view, as shown in Fig. 8, lies in a plane parallel to the plane which includes the axis of the sleeve 149, and comprises a straight slot 156 which is normal to the sleeve axis and parallel slots 157, 158 and 159 which extend normally from the slot 156 towards the main portion of the body 108, the slots 158 and 159 being located at the ends of the slot 156; respectively, and the slot 157 intermediate therebetween. The extension 155 is marked along one side of the slot as at 160, 161, 162 and 163 to indicate neutral, low, high and reverse positions, respectively, of the shift lever 152 when power is transmitted through the converter 16. Low, high and reverse positions 161, 162 and 163 lie opposite to the slots 157, 158 and 159 which determine low, high and reverse positions of the shift lever 152 during direct drive, all respectively. From the foregoing, it will be apparent that the lever 152 may be moved to and fro along the slot 156 to thereby rock the sleeve 149 and selectively position the cams 146, 147 and 148 with respect to their associated valves, or the lever may be moved into any of the slots 157, 158 and 159 to cause the plunger 151 to actuate the rocker 150 and shift the valve 119 to an open position.

The shapes and angular relation of the cams 146, 147 and 148 are illustrated in Fig. 7. The working surfaces or lands of the cams are particylindrical and have the same radius, with the cam 146 disposed in generally diametral relation to the cams 147 and 148. The land of the cam 147 is longer than that of and overlaps the land of the cam 148 and the trailing end of the land of the cam 147, considered with respect to its movement in a valve-opening direction which is clockwise in Fig. 7, is aligned with the corresponding end of the land of the cam 148. Hence, in one position of the sleeve 149, the cam 147 may open its valve 117 without either of the valves 116 and 118 being opened; in another position, the cam 147 maintains opening of the valve 117 and simultaneously the cam opens the valve 118 without the valve 116 being disturbed; and in another position, the cam 146 opens the valve 116 while the valves 117 and 118 are closed by their respective springs since the cams for the latter valves are in non-actuating positions. The ends of the land of the cam 146 connect by diverging chordal surfaces 164 with an annular bead 165 on the surface of the sleeve 149 and chordal surfaces 166 and 167 connect the ends of the lands of the cams 147 and 148 with annular beads 168 and 169 on the surface of the sleeve 149, all respectively. When the valves 116, 117 and 118 are closed, as shown in Fig. 6, the angular status of the sleeve 149 is such that the several cams are in the positions shown in Fig. 7 with the followers 142, 143 and 144 bearing against the beads 165, 168 and 169, respectively, which have the same diameter.

The details of the connections from the control valve 96 to the several clutches are illustrated in Figs. 1 and 2 to which reference will now be made. For the low clutch 51, the delivery end of the pipe 103 connects with a passage 170 in the housing wall 27 which in turn communicates with a radial passage 171 provided in a packing ring 172 that encircles the sleeve 19 adjacent the bearing 26. The inner end of the passage 171 connects with an annular channel 173 in the ring 172 which is in constant communication with a radial passage 174 in the sleeve 19 and the inner end of the latter passage connects with an annular passage 175 created by the already referred to spacing of the shaft 11 and the bore of the sleeve 19. The ends of the passage 175 are determined by a packing ring 176 carried by the shaft 11 and located just to the left of the passage 174 (see Fig. 1) and a packing ring 177 also carried by the shaft 11 and positioned in the plane of the pinion 29, or intermediate the low and reverse clutches 51 and 74, respectively. The annular passage 175 is in constant communication with a radial passage 178 in the sleeve 19 and the latter passage constantly connects with an annular channel 179 forming part of a radial passage 180 in a spacer ring 181 positioned between the sleeve 19 and the hub of the pinion 29. The inner end of the passage 180 merges into an annular channel 182 which constantly communicates with a passage 183 in the hub of the pinion 29 which connects with the low clutch cylinder 49.

For the high clutch 64, the delivery end of the pipe 106 connects with a radial passage 184 (see Fig. 1) in a holder ring 185 that is concentric with the output shaft 58 and is bolted to the housing wall 27. Interposed between the ring 185 and shaft 58 is a packing ring 186 having peripherally thereof an annular channel 187 which constantly registers with the inner end of the passage 184 and connects by way of an included longitudinal passage 188 with a passage 189 in the hub of the gear 57 which communicates with the high clutch cylinder 66.

For the reverse clutch 74, the delivery end of the pipe 104 connects with a radial passage 190 provided in a flanged portion 191 of the cover 30 that encircles the input shaft 11. The inner end of the passage 190 constantly communicates with an annular channel 192 provided in the hub of the disk 33 and inwardly of this hub, the channel 192 connects by way of an included, radial passage 193 with a registering radial passage 194 formed in the input shaft 11. The inner end of the passage 194 connects with a passage 195 that extends axially of the shaft 11 from the outer end thereof where it is closed by a plug 196 to a point to the right of the packing ring 177 (see Fig. 2). This inner end of the passage 195 connects through a radial passage 197 in the shaft 11 with an annular passage 198 established by the spacing of the sleeve from the shaft 11. The left end of the passage 198 is determined by the packing ring 177 and the right end by a packing ring 199 also carried by the shaft 11. A radial passage 200 in the sleeve 19 provides constant communication between the annular channel 201 provided in a spacer ring 202 interposed between the sleeve 19 and the hub of the pinion 29. An outer, annular channel 203 in the spacer ring 202 that is connected to the inner channel 201 by a radial passage 204 constantly communicates with a passage 205 in the hub of the pinion 29 that leads to the reverse clutch cylinder 72.

For the direct clutch 39 (see Fig. 2), the delivery end of the pipe 105 connects with a radial passage 206 in the annular flange 191 which communicates by way of, as it appears in Fig. 2, an inverted, generally U-shaped passage 207 in the disk 33 with the direct clutch cylinder 37.

In describing the operation of the transmission, it will be assumed first that the shift lever 152 is in neutral position 160 and that the engine is idling, thus driving the input shaft 11. Under these conditions, the cams 146, 147 and 148 occupy the positions shown in Fig. 7, the associated valves 116, 117 and 118, respectively, are closed as shown in Fig. 6, and the valve 119 is also closed since the rocker 159 is in the position also shown in Fig. 6. Hence, although the pump 90 is driven by the shaft 11, the closed positions of the several valves prevents application of pressure to the clutches 39, 51, 64 and 74 which are thus disengaged as shown in Fig. 2 and their respective supply pipes 105, 103, 106 and 104 are then in communication with the pipe 107 leading to the sump (see Fig. 6). Actuating liquid that may previously have engaged any of the clutches has been discharged to the sump by the action of the release spring for the clutch in question. Pressure developed by the pump 90 will be relieved by the valve 95 and the pump 97 will not be operating since it is driven from the output shaft 58 which is at rest. Whatever drag torque may be transmitted to the sleeve 19 through the converter 16 does not produce a drive of the output shaft 58 since converter drive of this shaft can only be effected through the low, high or reverse clutches which are disengaged.

In connecting the engine to the load, advantage is ordinarily taken of the high starting torque and capacity for rapid, smooth acceleration afforded by the converter in conjunction with the facility provided by this transmission of establishing definite speeds for the output shaft for any given engine speed. Assuming that the load is to be started in low gear through the converter, the shift lever 152 is moved from neutral position 160 to low gear position 161, thus rotating the sleeve 149 in a clockwise direction, as viewed in Fig. 7, until the land of the cam 147 engages the follower 143 and shifts the valve 117 downwardly to connect the passage 109 with the chamber 121 and to mask connection between the chamber 121 and the return passage 110. The valves 116 and 118 remain undisturbed during the above rotation of the sleeve since their followers 142 and 144 merely bear against other portions of the beads 165 and 169, and the valve 119 is also undisturbed since the shift lever 152 has not actuated the rocker 150.

The pressure of the pump 90 which has thus been established in the chamber 121 becomes effective in the passage 124, pipe 103 and the connecting passages and channels referred to above (see Fig. 2) leading to the low clutch cylinder 49. The low clutch 51 is thus engaged and transmits drive through the overrunning clutch 54, pinion 55 and gear 57 to the output shaft 58.

When the load is accelerated to the desired speed, the output shaft may be connected for high speed drive through the converter by engaging the high speed clutch 64. This result is accomplished by shifting the lever 152 from its low position 161 to the high position 162, thus further rotating the sleeve in a clockwise direction, as viewed in Fig. 7, until the land of the cam 148 engages the follower 144 and moves the valve 118 downwardly to connect the supply passage 109 with the chamber 122 and to deny communication between this chamber and the return passage 110. Under these conditions, it will be noted that, due to the working length of the cam 147 and its angular relation to the cam 148, the valve 117 controlling the application of pressure to the low clutch 51 remains open so that this clutch maintains its engagement.

Pump pressure being established in the chamber 122, it becomes effective through the passage 125, pipe 106 and the connecting passages and channels (see Figs. 1 and 2) leading to the high clutch cylinder 66. The high clutch 64 is thus engaged and the power, which is applied thereto through the pinion 29 and the gear 61, is transmitted by the clutch 64 through the gear 57 to the output shaft 58. Since the low clutch 51 remains engaged during engagement of the high clutch 64, the engine is never disconnected from the load and therefore the change from low to high speed is accomplished with a full power shift. The overrunning clutch 54 enables the high clutch 64, when engaged, to take command over the low clutch 51, also engaged, since the clutch 54 during high speed operation will rotate freely without transmitting power.

If it is desired to shift from high to low speed, the lever 152 is returned to the low position 161, thus rotating the sleeve 149 counterclockwise, as viewed in Fig. 7, until the land of the cam 148 is freed from the follower 144, but the cam 147 still bears against the follower 143 to thereby continue application of pressure to the low clutch 51. The valve 118 is returned to the closed position shown in Fig. 6 by the spring 128, denying application of pump pressure to the chamber 122 and hence to the high clutch cylinder 66 and connecting this cylinder through the chamber 122 with the return passage 110 leading to the sump 89. The release springs 69 thereupon return the piston 67 to the release position shown in Fig. 2 and the high clutch 64 is disengaged, whereupon the speed of the sleeve 19 increases until the overrunning clutch 54 again engages and power is again transmitted through the low clutch 51. This change from high to low speed is also accomplished with a full power shift.

In each of the forward speed drives above described, power flow is through the converter 16 and the reaction member 20 thereof is held from rotating in a reverse direction to provide the required changes in flow direction of the working liquid by the overrunning clutch 24. The transmission also may be conditioned for direct drive in either forward speed with a full power shift from hydraulic to direct drive and vice versa.

Considering a shift from high speed, converter drive to high speed, direct drive, the lever 152, at the beginning of this shift, is in high position 162 (see Fig. 8) and, as already described, the drive is through the converter 16 and the high clutch 64, the low clutch 51 also being engaged but not transmitting power. Moving the lever 152 from the high converter position 162 into the slot 158 determines high direct drive through the transmission in the following manner. Since this movement of the lever 152 does not change the rotational position of the sleeve 149 from that which it occupies during high speed, converter drive, the valves 117 and 118 remain open and the low and high clutches 51 and 64, respectively, maintain engagement. However, the indicated movement of the lever 152 does shift the plunger 151 which rotates the rocker 150 to thereby move the follower 145 downwardly (see Fig. 6) until the valve 119 opens to connect the supply passage 109 and the chamber 123 and to deny communciation between this chamber and the return passage 110.

Pump pressure is accordingly established in the chamber 123, pipe 105, and the connecting passages and channels (see Fig. 2) leading to the direct clutch cylinder 37. Therefore, the direct clutch 39 is engaged and the input shaft 11 is coupled directly to the sleeve 19 which transmits the drive to the output shaft 58 through the high clutch 64 in the manner described above for converter drive. Prior to shifting to high direct drive, the speed of the sleeve 19 is slightly less than engine speed due to the usual loss through the converter 16, but after shifting to direct drive, the speed of the sleeve 19 is equalized with that of the engine.

Hence, in direct drive, the converter pump 15 and turbines 17 and 18 rotate at the same or engine speed. Since there will not be any reaction against the blades of the reaction member 20, this member, as it is released by the overrunning clutch 24, will begin to rotate with the converter pump and turbines. In view of the fact that power is not then being transmitted through the converter and all parts thereof are rotating at substantially the same speed, the power loss in the converter circuit is negligible. In reality, the rotational speed of the reaction member 20 is slightly less than that of the pump and turbines due to the drag of the bearings and the overrunning clutch 24, but the difference is small.

If the load becomes too heavy to be carried in high speed, direct drive, the lever 152 is returned to high speed, converter drive position 162, thus enabling the valve 119 to be shifted by the spring 129 to the closed position shown in Fig. 6. The valves 117 and 118 remain open since the rotational position of the sleeve 149 is not disturbed. Pump pressure being cut off from the high clutch cylinder 37 and the latter being connected to the sump through the return passage 110, the high clutch piston 38 is moved to release position by the springs 43 and the high clutch 39 is disengaged. Since the converter pump and turbines are then rotating at engine speed, the converter 16 picks up the load immediately with the reaction member 20 held against rotation by the overrunning clutch 24.

In the change from high speed, converter drive to high speed, direct drive and also in the change in the opposite direction, the engine is always connected to the load and the same condition holds true for a change from low speed, converter drive to low speed, direct drive and vice versa. In a shift from low speed, converter drive to low speed, direct drive, the lever 152 is initially in low position 161 which, as already noted, conditions the sleeve 149 so that only the valve 117 is open and the low clutch 51 is engaged. Shifting the lever into the slot 157 does not disturb this rotational position of the sleeve 149, but does open the valve 119 in the manner described above to engage the direct clutch 39 which then establishes direct drive as indicated. Hence, the change from hydraulic to direct drive, and from direct to hydraulic drive in either low or high, forward speed is accomplished with a full power shift.

It is also possible to shift from low direct to high direct, or vice versa, with a full power shift, despite the fact that between these positions, the drive is temporarily through the converter 16.

To reverse the converter drive, the lever 152 is moved to reverse position 163 (see Fig. 8) which rotates the sleeve 149 counterclockwise as viewed in Fig. 7 and opens the valve 116 by means of the cam 146, the valves 117, 118 and 119 being closed by their respective springs. The valve 116 then permits communication between the supply passage 109 and the chamber 120, and denies communication between this chamber and the return passage 110. Pump pressure then becomes effective through the pipe 104 and the connected channels and passages (see Fig. 2) leading to the reverse clutch cylinder 72. The piston 73 thereupon engages the clutch 74 and reverse drive is transmitted to the output shaft 58 through gears 78, 79 and 80 (see Fig. 4).

Changing from reverse converter drive to reverse direct drive merely requires that the lever 152 be moved into slot 159 (see Fig. 8) which opens the valve 119 to effect an engagement of the direct clutch 39 without disturbing the engagement of the reverse clutch 74. The power then transmitted to the sleeve 19 by the direct clutch is applied through the pinion 29 to the reverse clutch 74.

When the lever 152 is moved from either of the reverse positions to neutral or any of the forward speed positions, the valve 116 is returned to the closed position shown in Fig. 6 by the spring 126 and the reverse clutch piston 73 is shifted to the release position shown in Fig. 2 by the springs 84, the oil in the cylinder 72 being discharged to the passage 110 and thence to the sump 89.

Changing from reverse converter to reverse direct drive and vice versa is characterized by a full power shift, but not in changing from any of the forward speeds to reverse and in the opposite direction since a full power shift is not desirable under these conditions.

While having general application, this transmission is more specifically intended for use in crawler tractors and trucks. The provision of the change speed mechanism enables the operator in either hydraulic or direct drive to select speed ratios that fit the work at hand and to effect these selections in all forward speeds, whether hydraulic or direct, with a full power shift, plus a like capacity in selecting hydraulic or direct drive in reverse speed. The transmission is compactly arranged, particularly as regards the use of a driving or input sleeve which surrounds the input shaft, is common to the converter and direct drive elements of the transmission, and is selectively connectible to the change speed devices.

We claim:

1. In a power transmission, the combination of an input shaft, a sleeve surrounding the input shaft, a hydraulic torque converter including a pump member connected to the input shaft, a turbine member and a reaction member, the turbine member being connected to one part of the sleeve and an overrunning clutch being interposed between the reaction member and a fixed part of the transmission, an output shaft, means connectible to the sleeve and output shaft comprising a low speed gear train including an overrunning clutch, a high speed gear train, and friction clutches for controlling power flow through the gear trains, respectively, a friction clutch for directly connecting another part of the sleeve to the input shaft, means for selectively controlling power flow through the converter or directly to the sleeve by disengaging and engaging the direct clutch, respectively, and means operable during converter and direct drive for selectively controlling the low speed clutch and for controlling the high speed clutch conjointly with the actuation of the low speed clutch.

2. In a power transmission, the combination of an input shaft, a sleeve surrounding the input shaft, a hydraulic torque converter including a pump member connected to the input shaft, a turbine member and a reaction member, the turbine member being connected to one part of the sleeve and an overrunning clutch being interposed between the reaction member and a fixed part of the transmision, an output shaft, means connectible to the sleeve and output shaft comprising a low speed gear train including an overrunning clutch, a high speed gear train, and hydraulically actuated friction clutches for controlling power flow through the gear trains, respectively, a hydraulically actuated friction clutch for directly connecting another part of the sleeve to the input shaft, and a hydraulic pressure system including all said clutches and a control valve, the valve being operable to selectively control power flow through the converter or directly to the sleeve by disengaging and engaging the direct clutch, respectively, and for converter and direct drives to selectively control the low speed clutch and the high speed clutch conjointly with the actuation of the low speed clutch.

3. In a power transmission, the combination of an input shaft, a sleeve surrounding the input shaft, a hydraulic torque converter including a pump member connected to the input shaft, a turbine member and a reaction member, the turbine member being connected to one end of the sleeve and an overrunning clutch being interposed between the reaction member and a fixed part of the transmission, an output shaft, means connectible to an intermediate portion of the sleeve and output shaft comprising a low speed gear train including an overrunning clutch, a high speed gear train, and hydraulically actuated friction clutches for controlling power flow through the gear trains, respectively, a hydraulically actuated friction clutch for directly connecting the other end of the sleeve to the input shaft, and a hydraulic pressure system including all said clutches and a control valve, the valve being operable to selectively control power flow through the converter or directly to the sleeve by disengaging and engaging the direct clutch, respectively, and for converter and direct drives to selectively control the low speed clutch and the high speed clutch conjointly with the actuation of the low speed clutch.

4. In a power transmission, the combination of an input shaft, a sleeve surrounding the input shaft, a hydraulic torque converter including a pump member connected to the input shaft, a turbine member and a reaction member, the turbine member being connected to one end of the sleeve and an overrunning clutch being interposed between the reaction member and a fixed part of the transmission, an output shaft, means connectible to an intermediate portion of the sleeve and the output shaft comprising a low speed gear train including an overrunning clutch, a high speed gear train, a reverse speed gear train and hydraulically actuated friction clutches for controlling power flow through the gear trains, respectively, a hydraulically actuated friction clutch for directly connecting the other end of the sleeve to the input shaft, and a hydraulic pressure system including all said clutches and a control valve, the valve being operable to selectively control power flow through the converter or directly to the sleeve by disengaging and engaging the direct clutch, respectively, and for converter and direct drives to selectively control the low speed clutch, the high speed clutch conjointly with the actuation of the low speed clutch, and the reverse clutch.

5. In a power transmission, the combination of an input shaft, a sleeve surrounding the input shaft, a hydraulic torque converter including a pump member connected to the input shaft, a turbine member and a reaction member, the turbine member being connected to one end of the sleeve and an overrunning clutch being interposed between the reaction member and a fixed part of the transmission, an output shaft, a carrier pinion splined to an intermediate portion of the sleeve, a high speed gear journaled on the output shaft in constant mesh with the carrier pinion, a low speed, hydraulically actuated friction clutch carried by one side of the carrier pinion, means driven by the low speed clutch comprising a second sleeve journaled on the first sleeve and internally splined for engagement with selected plates of the low speed clutch, a first gear journaled on the second sleeve, an overrunning clutch interposed between the second sleeve and first gear, and a second gear in constant mesh with the first gear and keyed to the output shaft, the first and second gears constituting a low speed gear train, a high speed, hydraulically actuated friction clutch carried by the second gear with the plates thereof alternately connected to the second gear and high speed gear, the carrier pinion, high speed and second gears constituting a high speed gear train, a reverse speed, hydraulically actuated friction clutch mounted on the other side of the carrier pinion, a reverse speed gear train driven by the reverse clutch comprising a pinion journaled on the first sleeve, a gear keyed to the output shaft and an idler gear meshing with the last named pinion and gear, a hydraulically actuated friction clutch for directly connecting the other end of the sleeve to the input shaft, and a hydraulic pressure system including all said clutches and a control valve, the valve being operable to selectively control power flow through the converter or directly to the sleeve by disengaging and engaging the direct clutch, respectively, and for converter and direct drives to selectively control the low speed clutch, the high speed clutch conjointly with the actuation of the low speed clutch, and the reverse clutch.

6. In a power transmission, the combination of an input shaft, a sleeve surrounding the input shaft, a hydraulic torque converter including a pump member connected to the input shaft and a turbine member connected to one part of the sleeve, an output shaft, means connectible to the sleeve and output shaft comprising a low speed gear train including an overrunning clutch, a high speed gear train, and friction clutches for controlling power flow through the gear trains, respectively, and means for selectively controlling the low speed clutch and for controlling the high speed clutch conjointly with the actuation of the low speed clutch.

7. In a power transmission, the combination of an input shaft, a sleeve surrounding the input shaft, a hydraulic torque converter including a pump member connected to the input shaft and a turbine member connected to the sleeve, an output shaft, means connectible to the sleeve and output shaft comprising a low speed gear train including an overrunning clutch, a high speed gear train, hydraulically actuated clutches for controlling power flow through the gear trains, respectively, and a hydraulic pressure system including all said clutches and a control valve, the valve being operable to selectively control the low speed clutch and the high speed clutch conjointly with the actuation of the low speed clutch.

8. In a power transmission, the combination of an input shaft, a sleeve surrounding the input shaft, a hydraulic torque converter including a pump member connected to the input shaft, a turbine member and a reaction member, the turbine member being connected to one end of the sleeve and an overrunning clutch being interposed between the reaction member and a fixed part of the transmission, an output shaft, a carrier pinion splined to an intermediate portion of the sleeve, a high speed gear journaled on the output shaft in constant mesh with the carrier pinion, a low speed, hydraulically actuated, friction clutch carried by one side of the carrier pinion, means driven by the low speed clutch comprising a second sleeve journaled on the first sleeve, a first gear journaled on the second sleeve, an overrunning clutch interposed between the second sleeve and first gear, and a second gear in constant mesh with the first gear and keyed to the output shaft, the first and second gears constituting a low speed gear train, a high speed, hydraulically actuated, friction clutch carried by the second gear with the plates thereof alternately connected to the second gear and high speed gear, the carrier pinion, high speed and second gears constituting a high speed gear train, a hydraulically actuated friction clutch for directly connecting the other end of the sleeve to the input shaft, and a hydraulic pressure system including all said clutches and a control valve, the valve being operable to selectively control power flow through the converter or directly to the sleeve by disengaging and engaging the direct clutch, respectively, and for converter and direct drives to selectively control the low speed clutch and the high speed clutch conjointly with the actuation of the low speed clutch.

9. In a power transmission, the combination of an input shaft, an output shaft, a member intermediate the shafts with respect to the direction of power flow, a hydraulic torque converter including a pump member connected to the input shaft, a turbine member and a reaction member, the turbine member being connected to one part of the intermediate member and an overrunning clutch being interposed between the reaction member and a fixed part of the transmission, means connectible to the intermediate member and output shaft comprising a low speed gear train including an overrunning clutch, a high speed gear train, and friction clutches for controlling power flow through the gear trains, respectively, a friction clutch for directly connecting another part of the intermediate member to the input shaft, means for selectively controlling power flow through the converter or directly to the sleeve by disengaging and engaging the direct clutch, respectively, and means operable during converter and direct drive for selectively controlling the low speed clutch and for controlling the high speed clutch conjointly with the actuation of the low speed clutch.

10. In a power transmission, the combination of an input shaft, an output shaft, a member intermediate the shafts with respect to the direction of power flow, a hydraulic torque converter including a pump member connected to the input shaft and a turbine member connected to the intermediate member, means connectible to the intermediate member and output shaft comprising a low speed gear train including an overrunning clutch, a high speed gear train, and friction clutches for controlling power flow through the gear trains, respectively, and means for selectively controlling the low speed clutch and for controlling the high speed clutch conjointly with the actuation of the low speed clutch.

JAMES B. BLACK.
WILBUR F. SHURTS.

REFERENCES CITED

The following references are of record in the file of this patent:

UNITED STATES PATENTS

| Number | Name | Date |
|---|---|---|
| 1,137,804 | Sperry | May 4, 1915 |
| 1,759,558 | Jacobs | May 20, 1930 |
| 1,900,119 | Lysholm | Mar. 7, 1933 |
| 2,226,802 | Black | Dec. 31, 1940 |
| 2,241,764 | Bollinger | May 13, 1941 |
| 2,386,217 | Kegresse | Oct. 9, 1945 |
| 2,397,883 | Peterson | Apr. 2, 1946 |
| 2,449,586 | Carnagua | Sept. 21, 1948 |

FOREIGN PATENTS

| Number | Country | Date |
|---|---|---|
| 867,896 | France | Dec. 2, 1941 |